US012663257B2

(12) United States Patent
Braun et al.

(10) Patent No.: US 12,663,257 B2
(45) Date of Patent: Jun. 23, 2026

(54) METHOD AND SYSTEM FOR ADJUSTING A REFERENCE SECTION OF AN OCT SYSTEM

(71) Applicant: TRUMPF Laser GmbH, Schramberg (DE)

(72) Inventors: Stefan Braun, Schramberg (DE); Jan-Patrick Hermani, Markgroeningen (DE); Martin Stambke, Dunningen (DE)

(73) Assignee: TRUMPF LASER SE, Schramberg (DE)

( * ) Notice: Subject to any disclaimer, the term of this patent is extended or adjusted under 35 U.S.C. 154(b) by 184 days.

(21) Appl. No.: 18/644,189

(22) Filed: Apr. 24, 2024

(65) Prior Publication Data

US 2024/0271923 A1     Aug. 15, 2024

Related U.S. Application Data

(63) Continuation of application No. PCT/EP2022/076494, filed on Sep. 23, 2022.

(30) Foreign Application Priority Data

Oct. 27, 2021     (DE) ..................... 10 2021 127 917.8

(51) Int. Cl.
| *G01B 9/02091* | (2022.01) |
| *B23K 26/03* | (2006.01) |
| *G01B 9/02055* | (2022.01) |

(52) U.S. Cl.
CPC ....... *G01B 9/02091* (2013.01); *G01B 9/0207* (2013.01); *B23K 26/03* (2013.01)

(58) Field of Classification Search
CPC ............ G01B 9/02064; G01B 9/02091; B23K 26/032; B23K 26/0643; B23K 26/0648; B23K 26/082; B23K 26/0876
See application file for complete search history.

(56) References Cited

U.S. PATENT DOCUMENTS

| 11,549,798 | B2 * | 1/2023 | Strebel | ................ B23K 26/048 |
| 2007/0013918 | A1 | 1/2007 | Hauger et al. | |

(Continued)

FOREIGN PATENT DOCUMENTS

| CN | 111643051 A | 9/2020 |
| DE | 10360570 A1 | 7/2005 |

(Continued)

OTHER PUBLICATIONS

Zhao Wang et al., "Cubic meter volume optical coherence tomography," Optical Society of America, 2016, pp. 1496-1503, vol. 3, Issue 12, Optica Publishing Group, Washington DC, USA.

*Primary Examiner* — Michael A Lyons
(74) *Attorney, Agent, or Firm* — LEYDIG, VOIT & MAYER, LTD.

(57)     ABSTRACT

A method for adjusting a reference section of an optical coherence tomography (OCT) system includes providing the OCT system, generating a measuring beam using the OCT system, conducting the measuring beam to a measurement object, generating a reference beam using the OCT system, conducting the reference beam through the reference section, superimposing the measuring beam reflected from the measurement object and the reference beam, registering interference signals between the measuring beam and the superimposed reference beam using an interferometer of the OCT system, dividing a scanning path of the measuring beam into measurement phases and positioning phases, and adjusting the reference section exclusively in the positioning phases.

15 Claims, 2 Drawing Sheets

(56)                    References Cited

U.S. PATENT DOCUMENTS

| | | | |
|---|---|---|---|
| 2010/0302550 | A1 | 12/2010 | Hacker et al. |
| 2013/0162948 | A1 | 6/2013 | Azdanfar et al. |
| 2013/0169971 | A1 | 7/2013 | Brown et al. |
| 2013/0308096 | A1 | 11/2013 | Engelhardt et al. |
| 2016/0039045 | A1* | 2/2016 | Webster ............ B23K 26/0643 |
| | | | 356/450 |
| 2016/0356595 | A1 | 12/2016 | Lessmueller et al. |
| 2018/0164089 | A1 | 6/2018 | Schönleber et al. |
| 2018/0168445 | A1 | 6/2018 | Horn |
| 2020/0001395 | A1 | 1/2020 | Kogel-Hollacher et al. |
| 2020/0037872 | A1 | 2/2020 | Shiba et al. |
| 2022/0357150 | A1* | 11/2022 | Stambke ............ B23K 26/032 |

FOREIGN PATENT DOCUMENTS

| | | | |
|---|---|---|---|
| DE | 102009022958 | A1 | 12/2010 |
| DE | 102012002012 | A1 | 8/2012 |
| DE | 102013008269 | A1 | 11/2014 |
| DE | 102015007142 | A1 | 12/2016 |
| DE | 102015015112 | A1 | 5/2017 |
| DE | 102016008184 | A1 | 1/2018 |
| DE | 102017128158 | A1 | 6/2018 |
| DE | 102018118501 | A1 | 2/2020 |
| RU | 2645005 | C1 * | 2/2018 |
| WO | WO 2012037694 | A2 | 3/2012 |

* cited by examiner

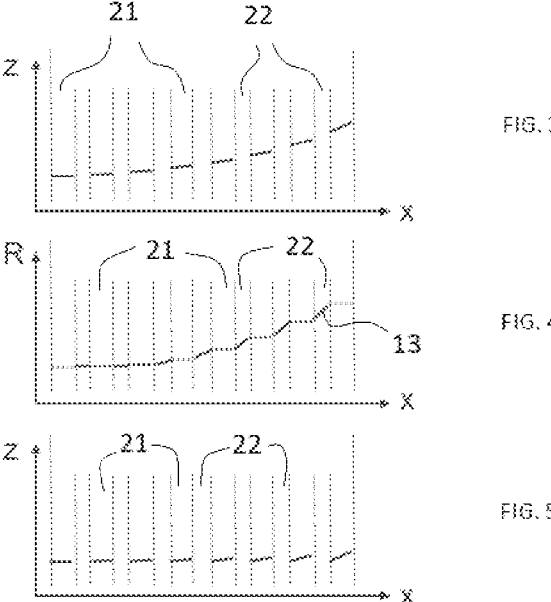
FIG. 3
FIG. 4
FIG. 5
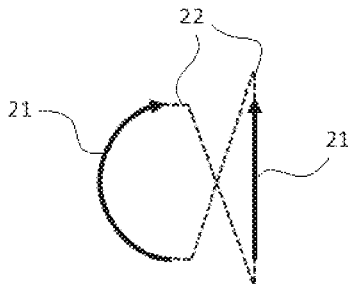
FIG. 6

METHOD AND SYSTEM FOR ADJUSTING A REFERENCE SECTION OF AN OCT SYSTEM

CROSS REFERENCE TO RELATED APPLICATIONS

This application is a continuation of International Application No. PCT/EP2022/076494 (WO 2023/072491 A1), filed on Sep. 23, 2022, and claims benefit to German Patent Application No. DE 10 2021 127 917.8, filed on Oct. 27, 2021. The aforementioned applications are hereby incorporated by reference herein.

FIELD

Embodiments of the present invention relate to a method and a system for adjusting a reference section of an OCT system.

BACKGROUND

The use of laser radiation is gaining importance in the industrial processing of workpieces, for example, for cutting or welding workpieces. The quality of the processing process and the processing result are determined and influenced using various technologies. A welding penetration depth on the workpiece can be determined, for example, in laser welding by means of optical coherence tomography (OCT). OCT measurement is generally an interferometric relative distance measurement in which the length of the optical path length of a measurement section is compared with the path length of a reference section. In OCT measurement, in general a measuring beam is brought into interference with a reference beam and length differences are thus determined on a measurement object. The measuring beam is incident on the measurement object and is reflected thereby, the reference beam passes through a reference section in this case, which is also designated as a reference arm.

In one variant of OCT systems, the measuring beam is deflected by rapidly movable optical elements so that the measuring beam passes over or scans the measurement area. Such OCT systems usually comprise an OCT beam source, an OCT scanner, and an OCT sensor. The measurement area of OCT systems is spatially restricted, however, which restricts the use in laser processing. If the zero position of the object to be measured or measurement object changes during a running measurement, for example, wherein the length of the measuring beam changes, for example, because the distance of the optical unit from the measurement object changes or the measuring beam is laterally deflected, and the reference beam is not tracked, the measurement area is thus further restricted.

To expand the measurement area of such OCT systems, readjusting the reference section synchronously with the length changes of the measuring beam has been proposed in the prior art. However, this proposal results in disturbances of the interference of the measurement signal and reference signal and inadequate measurement results.

SUMMARY

Embodiments of the present invention provide a method for adjusting a reference section of an optical coherence tomography (OCT) system. The method includes providing the OCT system, generating a measuring beam using the OCT system, conducting the measuring beam to a measurement object, generating a reference beam using the OCT system, conducting the reference beam through the reference section, superimposing the measuring beam reflected from the measurement object and the reference beam, registering interference signals between the measuring beam and the superimposed reference beam using an interferometer of the OCT system, dividing a scanning path of the measuring beam into measurement phases and positioning phases, and adjusting the reference section exclusively in the positioning phases.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 shows, by way of example, measured values in conjunction with the scanning path according to FIG. 2 without adjustment of the reference section, according to some embodiments;

FIG. 4 shows the adjusted reference section in conjunction with the scanning path according to FIG. 2, according to some embodiments;

FIG. 5 shows, by way of example, measured values in conjunction with the scanning path according to FIG. 2 and the adjustment of the reference section according to FIG. 4, according to some embodiments; and FIG. 6 shows a schematic view of a further scanning path having solid measurement phases in which measurement data are registered and dashed positioning phases in which the measuring beam jumps and no measurement data are registered, according to some embodiments.

DETAILED DESCRIPTION

Figure 1:
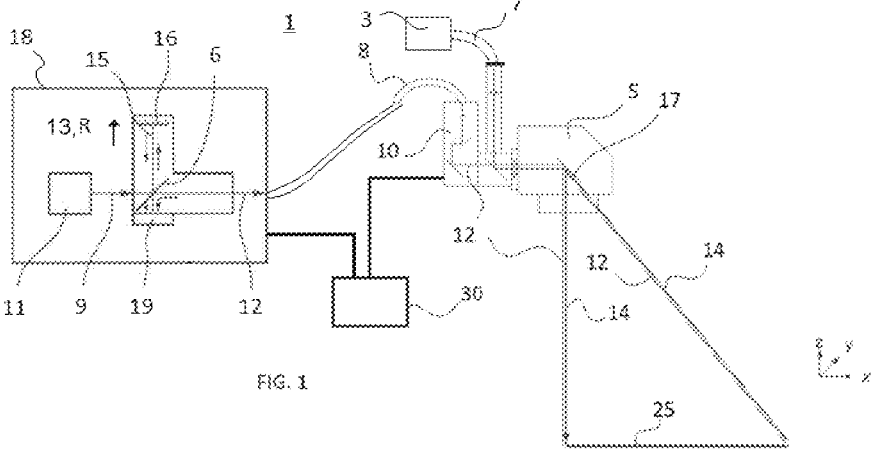
FIG. 1 shows a schematic side view of an OCT system for scanning a workpiece using a measuring beam and a reference beam and a laser scanner having a laser beam for processing the workpiece according to some embodiments.

Embodiments of the invention provide a method using optical coherence tomography (OCT) and an OCT system, which provides improved measurement results.

According to embodiments of the invention, the method for adjusting a reference section of an OCT system, comprising the following method steps providing an OCT system;

generating a measuring beam by way of the OCT system and conducting the measuring beam to a measurement object;

generating a reference beam by way of the OCT system and conducting the reference beam through a reference section;

superimposing the measuring beam reflected from the measurement object and the reference beam and registering interference signals between the measuring beam and the superimposed reference beam by means of an interferometer of the OCT system;

dividing a scanning path of the measuring beam into measurement phases and positioning phases; and adjusting the reference section exclusively in the positioning phases.

In addition, the object is achieved by an OCT system for adjusting a reference section, wherein the OCT system is designed to apply a measuring beam to the measurement objects, to conduct a reference beam through the reference section, and to superimpose the reflected measuring beam and the reference beam, comprising an interferometer for registering interference signals between the measuring beam and the superimposed reference beam, having measurement phases and positioning phases of a scanning path of the measuring beam, and an evaluation unit, which is designed to adjust the reference section exclusively in the positioning phases. The measurement area of OCT systems may be enlarged using these proposed solutions.

The scanning and recording of measurement data by the measuring beam advantageously takes place in the measurement phases, and the moving or jumping of the measuring beam takes place in the positioning phases without recording measurement data. In this way, measurement inaccuracies are avoided or at least substantially reduced.

In one example, the reference section is adjusted on the basis of correction data in the evaluation unit.

In a further example, the adjusting of the reference section is blocked or delayed by a signal of the evaluation unit in the positioning phases if the time intervals are too short for adjusting the reference section. The adjustment of the reference section is then carried out during following positioning phases, which have a sufficient duration for adjustment. This prevents the adjustment of the path length of the reference beam, the reference section, from taking place in sections of the measurement phases and measurement inaccuracies being introduced.

It has been recognized that in particular actuators for moving or pivoting an optical element in the OCT system, which respond within 1-2 ms, are suitable with regard to the duration of the positioning phases. The optical element is used for adjusting the reference section and can be designed as a reference beam mirror.

FIG. 1 shows a schematic side view of an OCT system 1, using which high-precision measurements are possible on a measurement object 25. The OCT system 1 comprises an OCT beam source 11 here for generating an OCT beam 9, a beam splitter 6 for splitting the OCT beam 9 into a measuring beam 12 and a reference beam 15, a reference beam mirror 16 for reflecting and adjusting the reference beam 15, and an OCT fibre 8 for conducting the measuring beam 12 to an OCT scanner 10. A housing 18 encloses the beam source 11, the beam splitter 6, the reference beam mirror 16, and an OCT sensor 19. OCT systems 1 as such are known for various possible applications in the prior art. In this case, height differences are measured by means of interference of the measuring beam 12 with the reference beam 15 conducted through a reference section 13. The reference section 13 is also designated as a reference arm. In this example, the measuring beam 12, after the OCT scanner 10, passes through a laser scanner 5 of a laser system, in which the measuring beam 12 is fed by a further optical element, a mirror 17, to a measurement object 25. Further optical elements can be designed for the purpose of deflecting the measuring beam 12. The laser system comprises a laser source 3 and a laser processing head, here the laser scanner 5, and is designed to generate a laser beam 14, which is suitable for processing the measurement object 25. The processing is, for example, welding by means of the laser beam 14, wherein the measurement object 25 is a workpiece of a specific material, such as a metal, such as a plate. The OCT scanner 10 and the laser scanner 5 are connected for signaling to at least one evaluation unit 30. The evaluation unit 30 comprises suitable means for controlling the OCT system 1 having the mentioned components and the laser system having laser scanner 5 and evaluating the data of the OCT system 1 and the laser scanner 5, in particular a programmed processor unit. Further processor units and control units can be provided. The laser radiation of the laser beam 14 having high energy is supplied from the laser source 3 via a laser light cable 7 to the laser scanner 5 and is applied to the measurement object 25 or workpiece via at least the pivotable mirror 17. For this purpose, the laser beam 14 is reflected from the pivotable mirror 17 and conducted to various positions on the measurement object 25. This is schematically shown in FIG. 1 by two laser beams 14, which are incident at various positions on the measurement object 25. One position can be, for example, a seam beginning and the second position can be a seam end of a weld seam produced by the laser beam 14. In a similar manner, the measuring beam 12, which extends approximately coaxially to the laser beam 14, is shown at the same two positions. These positions are again the seam beginning and the seam end of the weld seam, which is passed over or scanned by the measuring beam 12. The measuring beam 12 is reflected from the measurement object 25 and deflected on the mirror 17 to the OCT scanner 10. The optical element in the embodiment as the mirror 17 in the laser scanner 5 is accordingly used as the deflection means for the laser beam 14 and the measuring beam 12. The measuring beam 12 then passes through the OCT fibre 8 again and is guided by the beam splitter 6 to the OCT sensor 19. Alternatively, the measuring beam 12 is deflected by a circulator. In an interferometer of the OCT sensor 19, the measuring beam 12 interferes with the reference beam 15, which passes through the reference section 13 to the section covered by the measuring beam 12. Alternatively, the interferometer can also be arranged in the OCT scanner 10 and the reference section 13 extends in the OCT scanner 10, in contrast to the illustration in FIG. 1.

Figure 2:
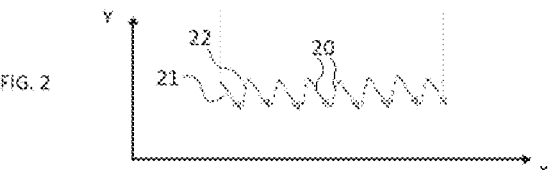
FIG. 2 shows an exemplary scanning path of a measuring beam having solid measurement phases, in which measurement data are registered, and dashed phases, in which the measuring beam jumps and no measurement data are registered, with reference to FIG. 1, according to some embodiments.

FIG. 2 shows an exemplary scanning path 20 of the measuring beam 12 along the measurement object 25, this is the course of the end point of the measuring beam 12 on the measurement object 25 in the direction of the x axis and the y axis with reference to FIG. 1. Measurement phases 21, in which measurement data are registered, are shown by solid arrow lines. Phases during which no measurement data are registered are shown by dashed lines, wherein the measuring beam 12 jumps or pivots over from one position of the scanning path 20 to another point of the scanning path 20. The evaluation unit 30 controls the OCT scanner 10, which positions the measuring beam 12 on the workpiece 25. The scanning path 20 can also comprise further geometric objects, such as a number of points. In the example according to FIG. 2, the OCT scanner 10 is in a measurement phase 21 during the solid arrows directed diagonally downward, while the OCT scanner 10 is in a positioning phase 22 during the dashed lines. During the measurement phases 21, measurement data are registered from the measurement object 25 by the OCT system 1 and the reference section 13 is not adjusted or tracked. During the positioning phase 22, no measurement data are registered from the measurement object 25 by the OCT system 1, but rather the reference section 13 is adjusted or tracked, as described under FIG. 4. In the brief time intervals of the positioning phases 22, the measuring beam 12 is also deflected by means of optics in the OCT scanner 10, so that the measuring beam 12 is incident after the deflection at another point on the measurement object 25. In other words, the point of incidence of the measuring beam 12 jumps from one point to a remote point on the measurement object 25. The measuring beam 12 jumps or is moved from the end of a measurement geometry, in this case from the end of a line, to the starting point of the next measurement geometry, in this case the beginning of the next line of the scanning path 20. After the deflection of the measuring beam 12 and the adjustment of the reference section 13, the next measurement phase 21 begins, in FIG. 2 at the next solid arrow.

For the case that the evaluation unit 30 establishes that the time for repositioning the measuring beam 12 is too short for the repositioning of the actuator for changing the reference section 13, a next measurement phase 21 is delayed accordingly. Accordingly, the reference section 13 is adjusted and the next measurement phase 21 only begins thereafter.

FIG. 3 shows, by way of example, measured values of the OCT system 1 in reference to FIG. 1 and FIG. 2. The measuring beam 12 is again deflected in the direction of the x axis, the measured values from the measurement object 25 are shown qualitatively on the z axis without adjusting the reference section 13. As a result of the deflection of the measuring beam 12 by the mirror 17, a laser scanner mirror, the z value rises along the x axis. These are undesired measurement inaccuracies, which occur without the described method and OCT system 1. In this example, a planar surface is measured by means of OCT for simplified illustration. The measurement data in the z axis should therefore be constant, since no height differences are present on the measurement object 25.

FIG. 4 shows the reference section 13 in conjunction with the scanning path 20 according to FIG. 2, wherein the reference section 13 is adjusted or tracked as described in this document. The x axis again designates the deflection of the measuring beam 12 of the OCT system 1 as shown in FIG. 1. The R axis designates the length of the reference beam 15, which interferes with the measuring beam 12. In other words, the R axis designates the reference section 13, also the reference arm. The reference section 13 is adjusted or tracked as described under FIG. 1, in this example by displacing the reference beam mirror 16 in the direction of the arrow (R) in FIG. 1. As is apparent in FIG. 4, the reference section 13 changes along the x axis during the positioning phases 22, shown by solid lines. During the measurement phases 21, the reference section 13 remains constant and is not adjusted or tracked, shown by dotted lines in FIG. 4. The reference section 13 is adjusted or tracked in the OCT system 1 in that, as above, an optical element reflecting the reference beam 15, the reference beam mirror 16, or a transmitting optical element (not shown) is displaced or tilted and the section covered by the reference beam 15 is thus changed. The reference beam mirror 16 in the OCT system 1 is driven by suitable fast actuators. A suitable actuator has a response time of approximately 1-2 ms and can be designed as a galvanometer actuator, piezoelectric actuator, or MEMS actuator.

Correction data are provided in the evaluation unit 30, which change the path length of the reference beam 15 and thus the reference section 13. The correction data in a correction file are dependent on the focal length of an objective in the laser scanner 5 and on the angle at which the measuring beam 12 is incident on the measurement object 25. This angle increases with increasing deflection of the measuring beam 12 by the mirror 17 from the left, where the angle is zero with a vertical measuring beam 12, to the right with reference to FIG. 1. The evaluation unit 30 initiates a displacement of the reference beam mirror 16 by means of an actuator on the basis of the correction data. The resulting reference beam lengthening in the entire processing field of the laser scanner 5 is in the millimetre range in this case.

FIG. 5 shows, by way of example, measured values of the OCT system 1 in conjunction with the scanning path 20 according to FIG. 2 and the illustration of the reference arm according to FIG. 4. The measuring beam 12 is again deflected in the direction of the x axis, the measured values from the measurement object 25 are shown qualitatively on the z axis with the adjustment or tracking of the reference section 13. In this case, in contrast to FIG. 3, the reference section 13 is adjusted as described and shown in FIG. 4, so that corrected measured values result. For the purpose of the illustration, a planar surface is again recorded by the OCT system 1. As can be seen, the measured values in the measurement phases 21 along the x axis are essentially constant with the exception of minor increasing deviations. In comparison to FIG. 3 without the adjustment as described in this document, the measurement results using the adjustment of the reference section 13 as in FIG. 5 are substantially improved. The planar surface of the measurement object 25 is represented in the measurement results according to FIG. 5 as a nearly planar surface over the entire measurement area. Similar results are obtained upon measurement on measurement objects 25 having irregularities, for example, at weld seams as described under FIG. 1.

FIG. 6 shows a schematic view of a further scanning path 20 with solid measurement phases 21, in which measurement data are registered, and dashed positioning phases 22 or infeed phases, in which no measurement data are registered. In this example, the measuring beam 12 sweeps upward in the direction of the arrow in a straight line in a first measurement phase 21, a signal from the evaluation unit 30 ends the measurement phase 21, the measuring beam 12 is deflected, moved, or jumps to a position at the beginning of the curved arrow on the bottom left, after which a signal of the evaluation unit 30 starts the next measurement phase 21. In the jump time of the measuring beam 12 from the endpoint of the straight line to the starting point of the curved line, in the positioning phase 22, the reference section 13 is adjusted. The measuring beam 12 can also be positioned at a point before the starting point of the curved line. This has the advantage that after blocking or delay of the measurement, wherein the mirror 17 is stopped, the mirror 17 can be accelerated up to the starting point to a speed required for measurement. The measuring beam 12 then scans along an arced line directed upward. As described, the reference section 13 remains constant during the measurement phase 21. When the measuring beam 12 has reached the end of the arced arrow, the scanning path 20 is ended in accordance with the measurement geometry or a new scanning path 20 starts.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 OCT system
3 laser source
5 laser scanner
6 beam splitter
7 laser light cable
8 OCT fibre
9 OCT beam
10 OCT scanner
11 OCT beam source
12 measuring beam
13 reference section
14 laser beam
15 reference beam
16 reference beam mirror
17 mirror
18 housing
19 OCT sensor
20 scanning path
21 measurement phase
22 positioning phase
25 measurement object
30 evaluation unit

The invention claimed is:

1. A method for adjusting a reference section of an optical coherence tomography (OCT) system, the method comprising:

providing the OCT system;

generating a measuring beam using the OCT system, and conducting the measuring beam to a measurement object along a scanning path;

generating a reference beam using the OCT system, and conducting the reference beam through the reference section;

superimposing the measuring beam reflected from the measurement object and the reference beam, and registering interference signals between the measuring beam and the superimposed reference beam using an interferometer of the OCT system;

dividing the scanning path of the measuring beam into measurement phases and positioning phases; and adjusting the reference section exclusively in the positioning phases while the measuring beam is being conducted to the measurement object along the scanning path.

2. The method according to claim 1, further comprising:

scanning and recording measurement data using the measuring beam in the measurement phases; and moving or jumping the measuring beam in the positioning phases without recording the measurement data.

3. The method according to claim 1, wherein the adjusting the reference section is performed based on correction data in an evaluation unit.

4. The method according to claim 1, further comprising:

blocking or delaying the adjusting the reference section of the reference beam in response to a signal of the evaluation unit in the positioning phases if time intervals are too short for the adjusting the reference section.

5. The method according to claim 1, wherein the adjusting of the reference section is performed by activating and moving or pivoting at least one optical element in an OCT scanner of the OCT system.

6. The method according to claim 5, further comprising:

providing actuators for the moving or pivoting the optical element in the OCT system within 2 ms.

7. The method according to claim 1, wherein the scanning path is continuous from a beginning point to an ending point, and wherein the measurement phases and the positioning phases are within the continuous scanning path between the beginning point and the ending point.

8. The method according to claim 1, wherein at least part of the scanning path includes two or more measurement phases and two or more positioning phases that alternate such that each of the two or more measurement phases is preceded by or followed by a respective one of the two or more positioning phases, or such that each of the two or more positioning phases is preceded by or followed by a respective one of the two or more measurement phases.

9. The method according to claim 1, wherein adjusting the reference section in the positioning phases comprises deflecting the measuring beam such that the measuring beam is incident on a first point of the measurement object at a beginning of a respective positioning phase and incident on a second point of the measurement object different from the first point at an end of the respective positioning phase.

10. The method according to claim 1, wherein the measuring beam is conducted but no measurement data is registered during the positioning phases.

11. An optical coherence tomography (OCT) system for adjusting a reference section thereof, the OCT system being configured to apply a measuring beam to a measurement object along a scanning path, to conduct a reference beam through the reference section, and to superimpose the measuring beam reflected from the measurement object and the reference beam, the OCT system comprising:

an interferometer for registering interference signals between the measuring beam and the superimposed reference beam, wherein the scanning path of the measuring beam is divided into measurement phases and positioning phases, and wherein the OCT system is configured to adjust the reference section exclusively in the positioning phases while the measuring beam is being applied to the measurement object along the scanning path.

12. The OCT system according to claim 11, wherein the OCT system is configured to block or delay a following measurement if the positioning phases are too short for the adjusting the reference section.

13. The OCT system according to claim 11, further comprising an OCT beam source, a beam splitter, a reference beam mirror, an OCT fibre, an OCT sensor, and an OCT scanner.

14. The OCT system according to claim 11, further comprising actuators for moving or pivoting an optical element in the OCT system within 2 ms to adjust the reference section.

15. The OCT system according to claim 11, wherein a laser system is assigned to the OCT system, wherein the laser system is suitable for processing the measurement object, and the OCT system is configured to scan the measurement object during and/or after the processing by the laser system.

\* \* \* \* \*